April 5, 1932.  K. E. MOREE  1,852,126
TRANSMISSION MECHANISM FOR TRACTORS AND THE LIKE
Filed March 6, 1930   8 Sheets-Sheet 1

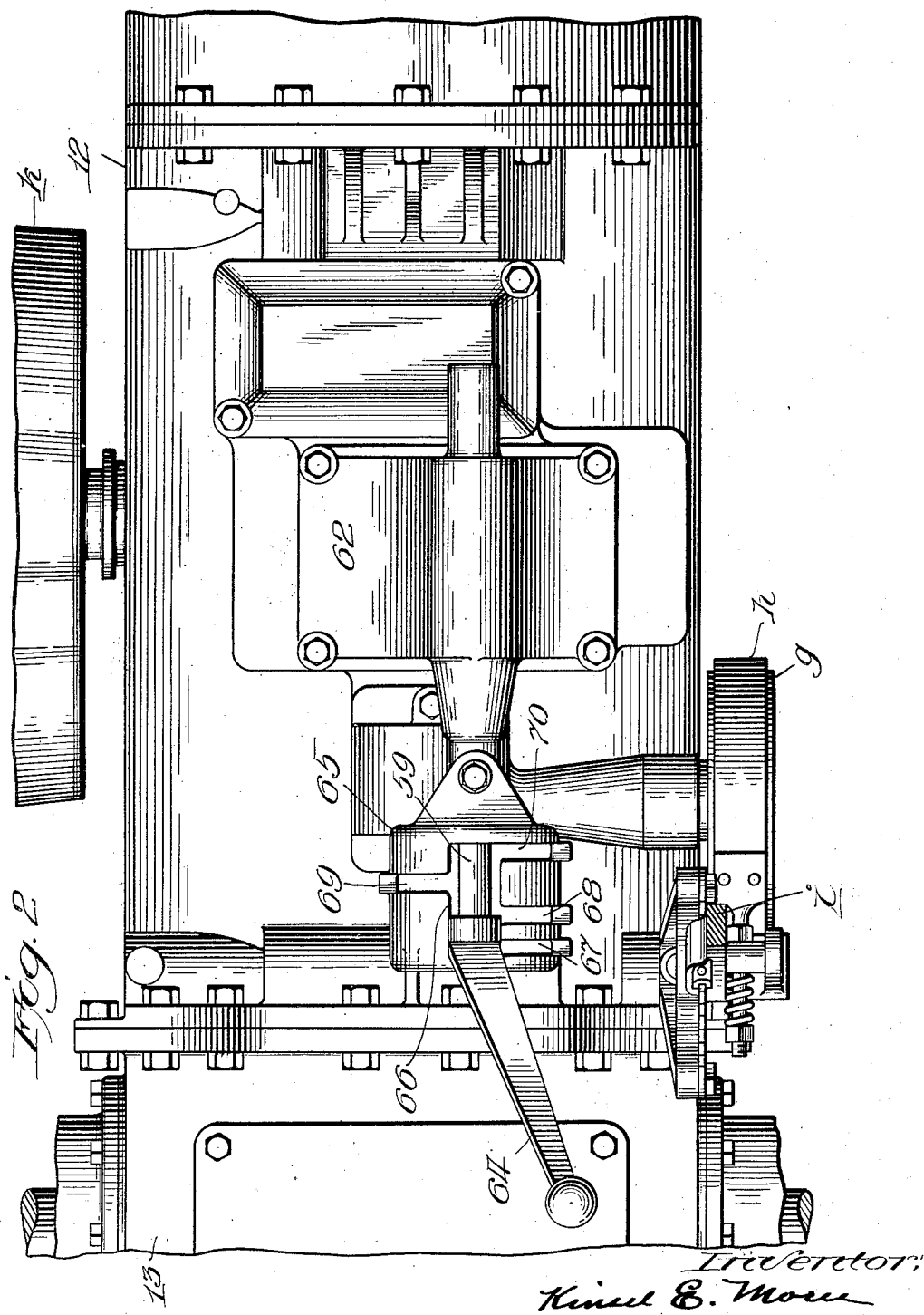

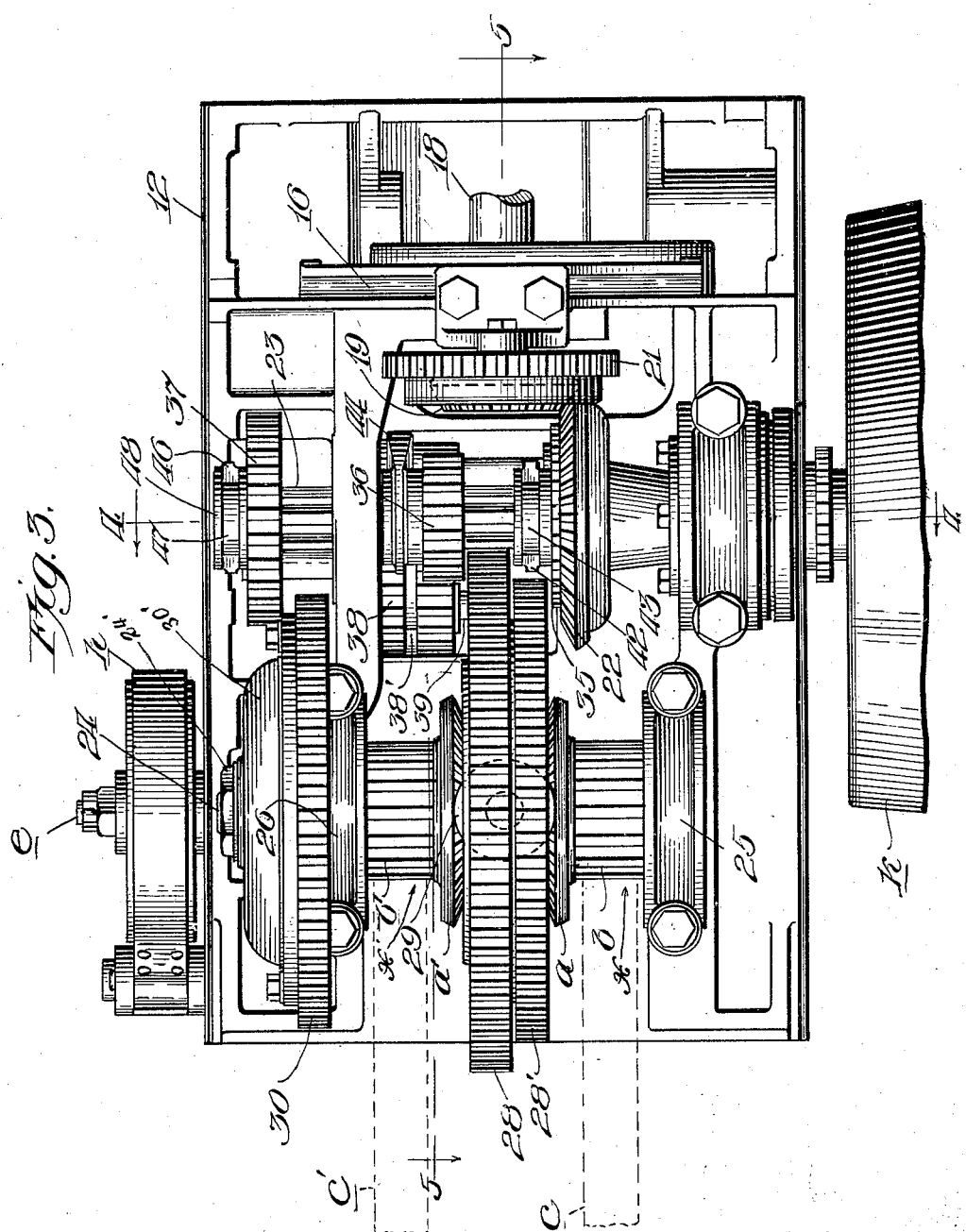

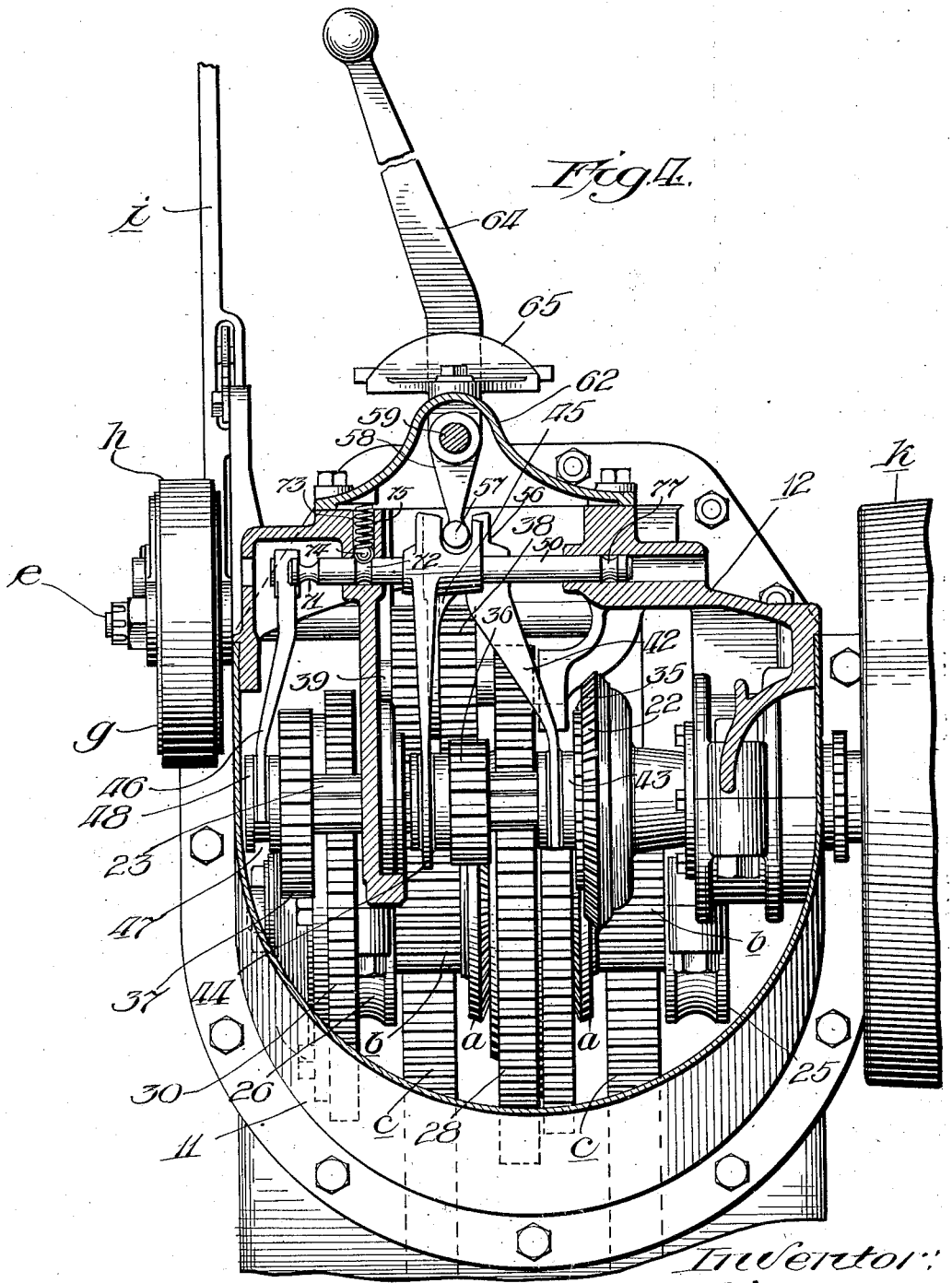

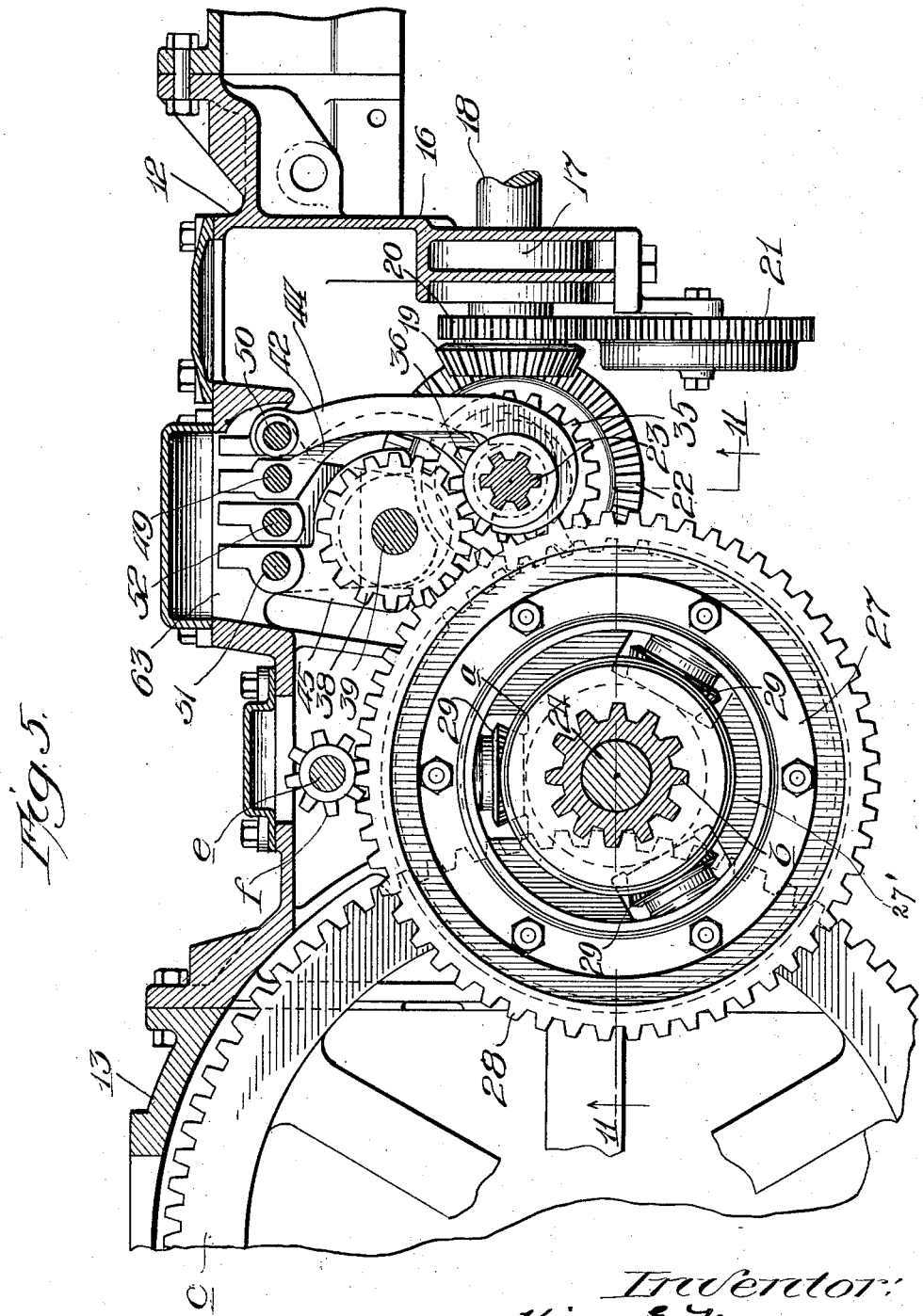

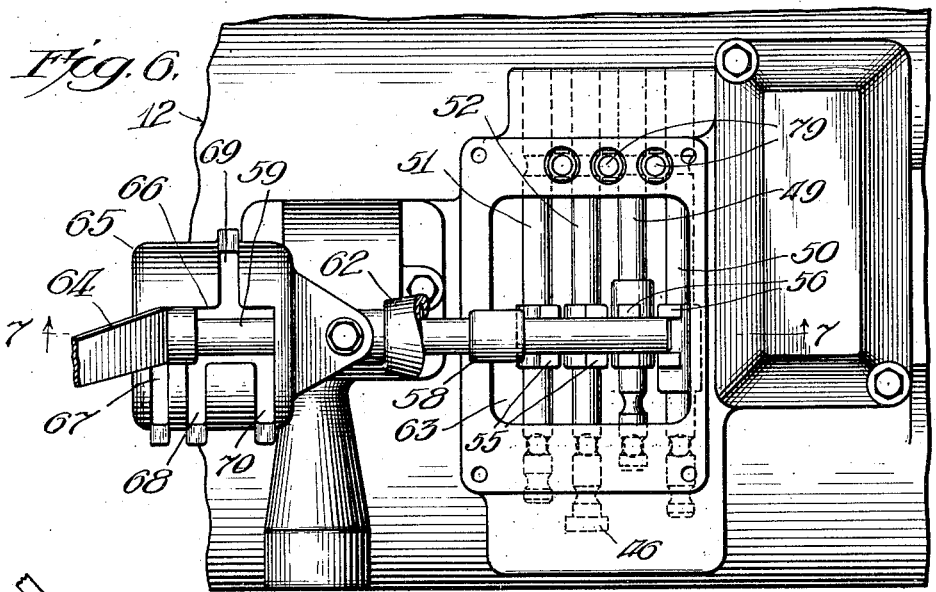

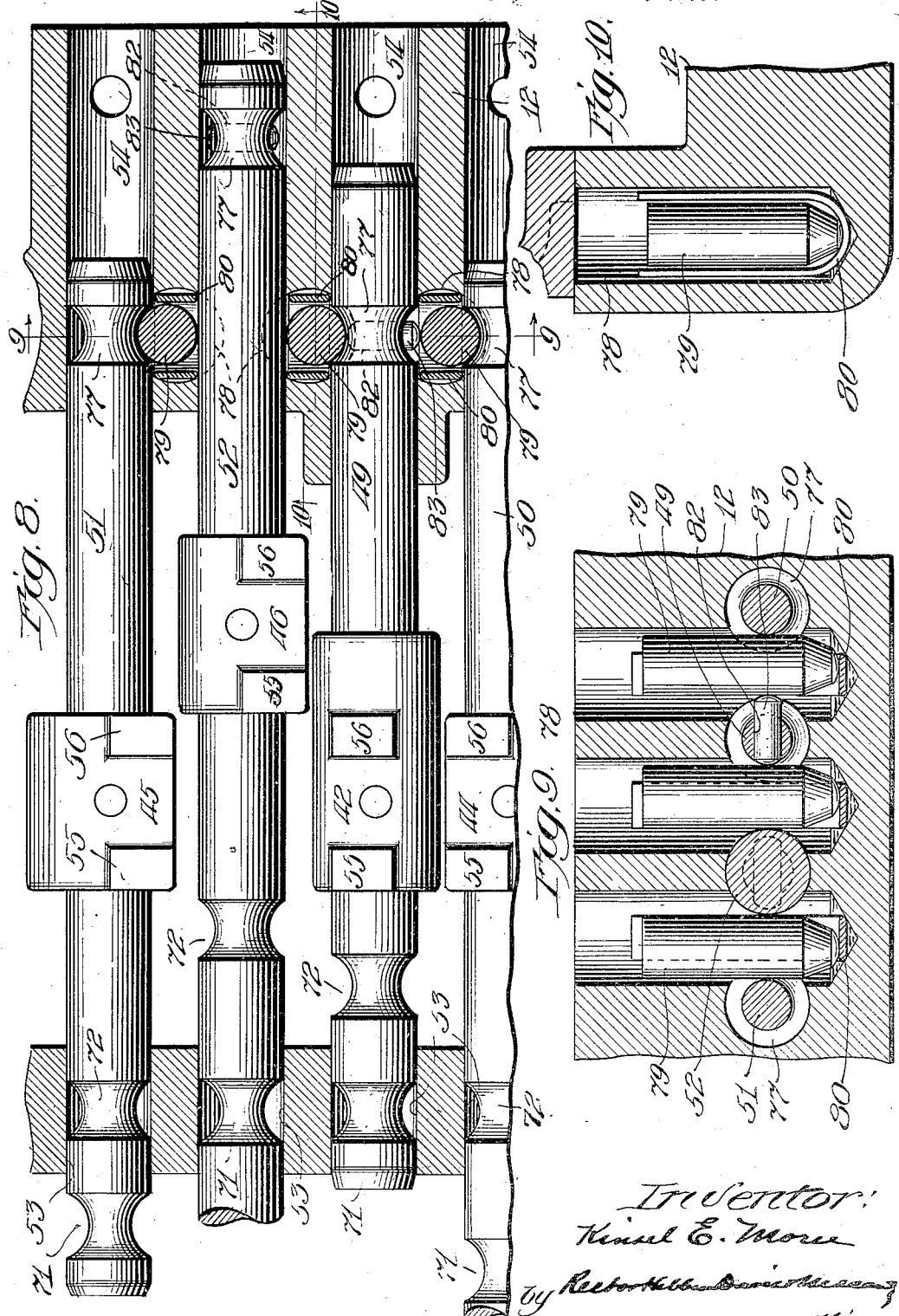

April 5, 1932. K. E. MOREE 1,852,126
TRANSMISSION MECHANISM FOR TRACTORS AND THE LIKE
Filed March 6, 1930 8 Sheets-Sheet 8
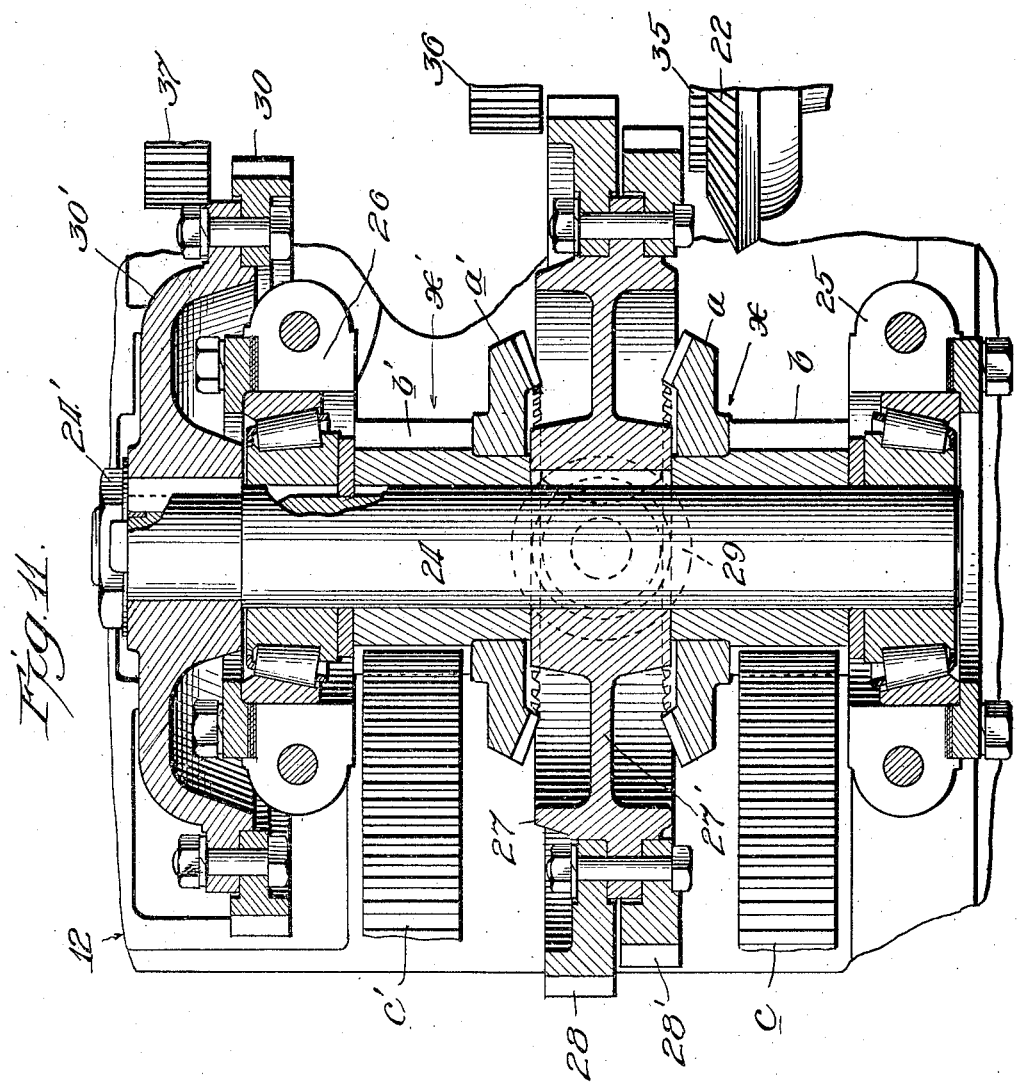

Patented Apr. 5, 1932

1,852,126

UNITED STATES PATENT OFFICE

KINSEL E. MOREE, OF RACINE, WISCONSIN, ASSIGNOR TO THE MASSEY-HARRIS CO., OF RACINE, WISCONSIN, A CORPORATION OF MARYLAND

TRANSMISSION MECHANISM FOR TRACTORS AND THE LIKE

Application filed March 6, 1930. Serial No. 433,569.

My invention relates more particularly to transmission mechanism for tractors and the like in which three speeds forward besides the reverse are provided. The object of the invention is to improve mechanism of this character in respect to simplicity of construction, ease of manufacture and certainty of operation. The invention consists in the features of construction pointed out in the claim hereof, in which I have endeavored to cover the invention as broadly as possible consistent with the prior art, the detailed disclosure in the drawings and specification being for the purpose of exemplification only.

In the drawings accompanying and forming a part of the specification, Figure 1 is a side elevation of so much of a tractor as is necessary to disclose the invention, the part of the shell of the tractor being broken away to show the interior;

Fig. 2 is a plan of the same portions of the machine;

Fig. 3 is a bottom plan view of the portion of the tractor to which my invention relates;

Fig. 4 is a transverse vertical section taken on the plane of the line 4—4 of Fig. 3;

Fig. 5 is a longitudinal vertical section taken on the plane of the line 5—5 of Fig. 3, the parts being shown in elevation;

Fig. 6 is a plan of a detail, a covering plate being removed to show the internal construction;

Fig. 7 is a vertical section of the same detail on the plane of the line 7—7 of Fig. 6, looking in the direction of the arrows;

Fig. 8 is an enlarged horizontal section, parts being shown in elevation;

Fig. 9 is a vertical longitudinal section on the line 9—9 of Fig. 8;

Fig. 10 is a vertical transverse section on the plane of the line 10—10 of Fig. 9; and Fig. 11 is a horizontal section on line 11—11 of Fig. 5.

Figure 1:
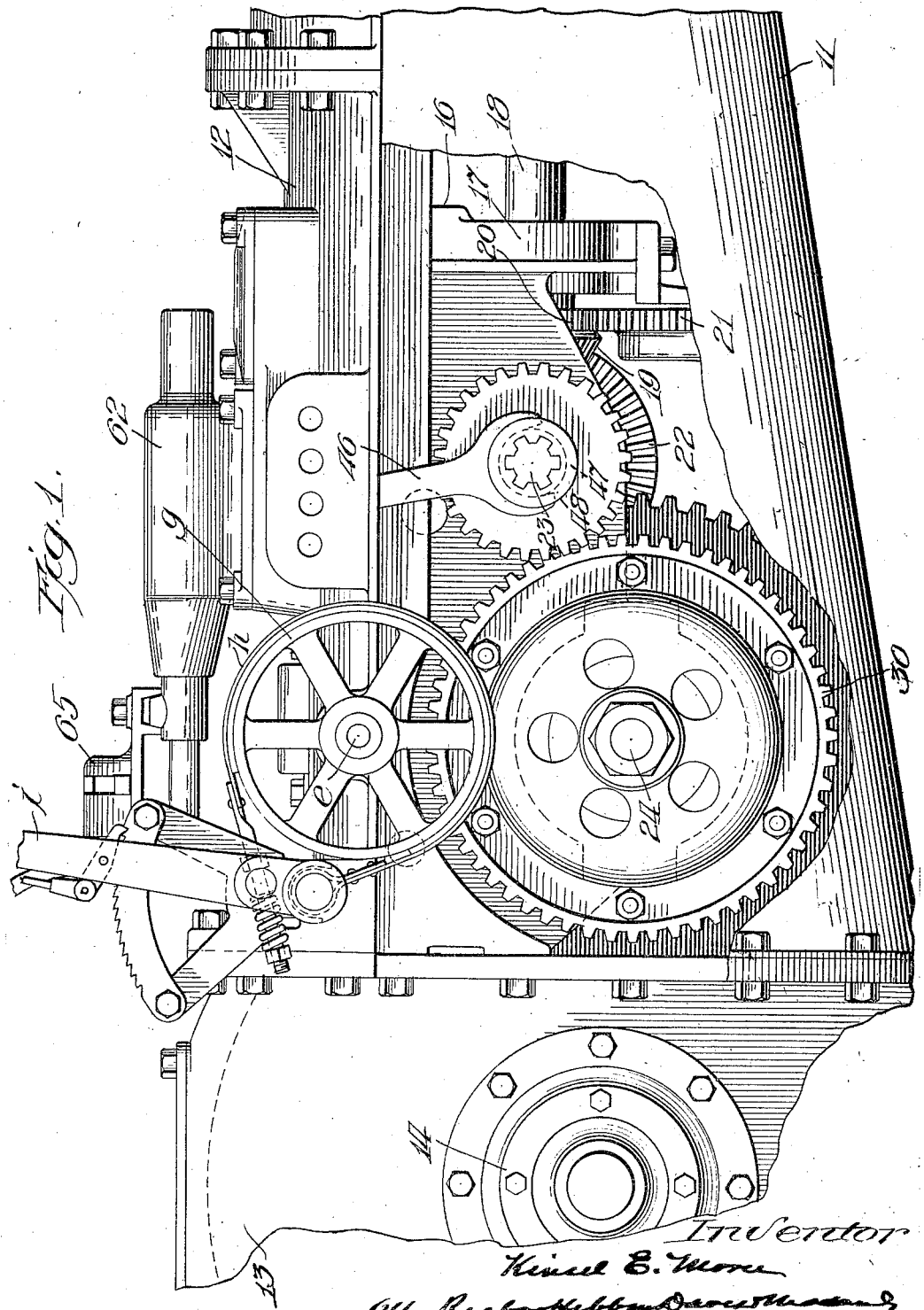

In the specific embodiment of the invention herein shown and described, the invention is applied to the form of tractor engine illustrated in patent to Eason and Hendrickson, No. 1,205,982, patented November 28, 1916, to which reference may be made for the general structure of the machine, though it is to be understood and will be clear from the following description and claim that the invention is also applicable to other forms of tractors. In the form of tractor illustrated, the body or frame of the machine comprises a transversely U-shaped trough or body member 11 upon the edges of which is mounted a casting 12 supporting the transmission mechanism, which projects into the trough member 11. A rear frame membr 13, which may be a hollow casting and carries the bearings 14 for the shafts of the rear or driving wheels is bolted to the trough member 11 and the transmission mechanism casting 12, as clearly shown in Fig. 1. The three members just mentioned constitute an enclosing casing and supporting frame for the transmission mechanism to be presently described and the connections intermediate the same and the rear or driving wheels.

At its forward end the casting 12 is bolted to the rear end of the engine casting of the tractor which is likewise mounted upon the edges of the trough member 11. This manner of constructing the frame of the tractor forms no part of the present invention but is described and claimed in an earlier application No. 232,288, filed November 10, 1927.

Near its forward end the casting 12 is provided with a depending transverse web 16 in which is formed a bearing 17 for the rear end of the power shaft 18 by means of which power is transmitted from the engine to the transmission and differential mechanism. The power shaft carries a bevel pinion 19 at its rear end and adjacent the same a pinion 20 meshing with an idler pinion 21 which latter, in practice, dips into oil within the casing and carries it to the pinion 20 from which it flows to lubricate the pinion 19 and the bearing 20 of the power shaft. This lubricating feature, however, forms no part of the present invention.

As best seen in Figs. 3 and 5 of the drawings, pinion 19 meshes with and drives the bevel gear 22 on the speed change shaft 23 which is journaled transversely of the machine and on which the speed changing pinions, presently to be described are keyed. These speed changing pinions are adapted to mesh respectively with gears 28, 28′ and 30 through which the bull gears $c$, $c'$ secured on the axles of the respective driving wheels are driven.

Large gear 28 and intermediate gear 28′ are mounted upon the periphery of the differential spider 27 on which are radially journaled the differential bevel pinions 29. On opposite sides of the spider and meshing with the pinions 29 are the bevel gears $a$, $a'$ each of which forms a compound gear with a crown gear $b$, $b'$ the latter being respectively in engagement with the bull wheels $c$, $c'$ above mentioned. Thus when the spider is driven from the speed change shaft 23 through either gear 28 or 28′ the bull wheels and traction wheels of the tractor are driven. The compound gear $a'$, $b'$ is journaled in the bearing 26 and the compound gear $a$, $b$ is journaled in the bearing 25. A shaft 24 extends through the differential spider and through the compound gears on opposite sides thereof and beyond the bearing 26. The compound gears turn freely on the shaft while the spider is keyed thereto and revolves therewith. Beyond the bearing 26 a smaller gear 30 is keyed upon the end of the shaft 24 and secured thereon by the nut 24′. For the sake of compactness, in the specific illustration of the invention, gear 30 is connected to the shaft through a dished annulus 30′ to which the gear is bolted so that it partly overlies the bearing 26. It will thus be seen that the spider of the differential mechanism, and hence the compound gear, bull wheels and traction wheels may be driven either directly through gear 28 or gear 28′ or indirectly through gear 30 keyed to the shaft to which the spider is likewise keyed.

Of the pinions upon the speed change shaft 23, pinion 35 may be thrown into and out of engagement with gear 28′, pinion 36 with gear 28 and pinion 37 with gear 30 by suitably shifting said pinions upon the speed change shaft. For low speed, the pinion 36 is thrown into engagement with the gear 28, for intermediate speed the gear 35 is thrown into engagement with gear 28′ and for high speed the pinion 37 is thrown into engagement with gear 30. The speed changing pinions are keyed upon the speed change shaft in the usual manner. A reverse gear 38 is mounted to revolve and slide upon shaft 39 and is continuously in engagement with pinion 36. It is adapted to be shifted into and out of engagement with the large gear 28 and when so engaged drives the machine backward.

For shifting the various speed changing gears I employ the usual forks or yoke members attached to sliding rods, but provide the latter, in addition to the usual impositive locks for holding them in adjusted position, with a positive locking means such that when either of the rods is in operative or engaging position it is impossible for the other rods to move until the first mentioned rod is returned to neutral or inactive position. As seen in Figs. 4 and 5, the fork 42 engages a groove in the hub 43 of the pinion 35, the fork 44 is similarly engaged with pinion 36, the fork 45 engages the intermediate groove 38′ in the reverse pinion and the fork 46 engages a groove 47 in the hub 48 of pinion 37. Fork 42 is fixed to slide rod 49, fork 44 to slide rod 50, fork 45 to slide rod 51, and fork 46 to slide rod 52. The slide rods are arranged as usual in a horizontal row and are guided in openings 53, 54 formed as shown in the main transmission casting 12. The collars of the forks, by means of which they are mounted on the respective slide rods, are, as usual, formed with upwardly projecting lugs 55, 56 between which the rounded end 57 of the shifting arm 58 is adapted to engage. Arm 58 is fixed to an oscillatory and sliding rod 59 journaled and slidable in bearings 60, 61 in a housing 62 which is bolted over the opening 63 in the main transmission mechanism supporting casting (see also Figs. 6 to 10). The shifting rod 59 is provided with a handle 64 for oscillating and sliding said rod. Casting 65, attached to the housing 62, is a handle guiding and locating means of conventional type. It is formed with a longitudinal slot 66 for permitting the sliding movement of the handle and rod 59, and locating side slots 67, 68, 69, and 70 into which the handle may be swung when properly adjusted longitudinally of the machine to bring the shifting arm 58 into engagement with the desired shifting fork. Slot 67 is located to receive the handle when in engagement with the reverse shifting fork 45, slot 68 receives the handle when it is in engagement with the fork 46 for throwing in the high gear, slot 69 receives the handle for throwing in the intermediate gear and slot 70 receives the handle for throwing in the low gear.

As shown in Fig. 4 each of the slide rods carrying the shifting forks is provided with the usual impositive lock whereby it is yieldingly held, when adjusted, either in the active or in the inactive position. For this purpose the rod is formed with two adjacent grooves 71, 72 adapted to register respectively with a pocket 73 in the casting through which the rods reciprocate, accordingly as the rod is in the active or inactive position, and a ball 74 in said pocket is pressed by a spring 75 against said rod. The ball yields to permit a sliding of the rod when the handle is operated to shift the latter but yieldingly holds the rod for the purpose of preventing accidental displacement. I have found, however, that such an impositive lock is not entirely dependable and therefore I have provided the gear shifting rods of my construction with an interlocking means which, when one of the rods is displaced from neutral position absolutely prevents movement of the other rods. Referring now more particularly to Figs. 8, 9 and 10, it will be observed that each of the sliding rods is formed with an annular groove or necked portion 77 so located that when the rods are in the neutral or inactive position, the grooves are in the same transverse vertical plane. The casting in which the rods are guided is cut out at 78 to form openings between the adjacent bores in which the respective slide rods are guided, and this may be conveniently done by drilling vertical holes in the casting at the proper point as shown. In each such opening there is contained a locking plug 79 which is free to move laterally therein. Preferably, in order to prevent undue movement of the plugs longitudinally of the sliding rods, each of them is partially surrounded by a U-shaped strip 80 which extends beneath and upon the sides of the plug. The plugs are of a diameter greater than the distance between the cylindrical portions of the slide rods so that when one of the rods adjacent the plugs is in active position, and consequently with the cylindrical portion thereof extending past the adjacent plug, the plug extends into the groove of the other adjacent slide rod and thus locks the latter against longitudinal movement and it remains so locked until the first-mentioned rod is withdrawn to neutral position. With the construction as thus far described, when two adjacent rods are in the neutral position, with their grooves in register with the intermediate plug, neither of the rods would be positively locked until the other were moved to active position, since the plug is free to move into the reduced portion or groove of either rod thus freeing the other. In order that the rods more remote from a rod in active position may also be locked, therefore, I drill the intermediate rods 49, 52 through the reduced portions 77 thereof, horizontally, as at 82 and insert in the bores so formed, slide pins or bolts 83 having rounded ends and of a length approximately equal to, but no greater than the distance from the bottom of the groove on one side of a sliding rod, to the cylindrical surface on the other side of the rod. When, therefore, one of the sliding rods is in active position, as the rod 52 in Fig. 8, the plug forced into the groove of the adjacent rod 49 having a shifting pin therein, forces said pin against the plug on the other side of the last-mentioned rod and thus forces the last-mentioned plug into the groove or neck of the adjacent rod, as the rod 50 in said figure. Thus, all of the slide rods except the one in active position, are securely locked against longitudinal movement and they remain so locked until the rod which has been moved to active position is returned to its original position.

I claim:
In a speed changing and differential mechanism for tractors and the like, a speed change shaft, speed changing pinions slidable thereon, means for sliding said pinions, a differential spider, gears on said spider with which certain of said speed changing gears respectively engage, differential pinions on the spider, differential gears on the respective opposite sides of said spider engaging said differential pinions, means for driving the respective wheels of the tractor from said differential gears, a shaft to which said spider is secured, and which extends through said differential gears, bearings for said shaft outside said differential gears, and a gear secured to said shaft beyond one of said bearings and adapted to engage one of said speed changing pinions.

In testimony whereof, I have subscribed my name.

KINSEL E. MOREE.